United States Patent
Shiomi

(10) Patent No.: US 8,102,359 B2
(45) Date of Patent: Jan. 24, 2012

(54) LIQUID CRYSTAL DISPLAY DEVICE

(75) Inventor: Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 779 days.

(21) Appl. No.: 12/087,382

(22) PCT Filed: Nov. 20, 2006

(86) PCT No.: PCT/JP2006/323092
§ 371 (c)(1),
(2), (4) Date: Jul. 2, 2008

(87) PCT Pub. No.: WO2007/102259
PCT Pub. Date: Sep. 13, 2007

(65) Prior Publication Data
US 2009/0135126 A1    May 28, 2009

(30) Foreign Application Priority Data

Mar. 7, 2006 (JP) ................................. 2006-061662

(51) Int. Cl.
*G09G 3/36* (2006.01)
(52) U.S. Cl. .................. 345/102; 345/690; 345/204
(58) Field of Classification Search .............. 345/204, 345/690, 98, 99, 100, 102
See application file for complete search history.

(56) References Cited

U.S. PATENT DOCUMENTS

| | | | |
|---|---|---|---|
| 6,693,619 B1 * | 2/2004 | Miura et al. | 345/102 |
| 6,803,901 B1 * | 10/2004 | Numao | 345/102 |
| 6,816,142 B2 * | 11/2004 | Oda et al. | 345/89 |
| 6,933,918 B1 * | 8/2005 | Park et al. | 345/102 |
| 7,233,304 B1 * | 6/2007 | Aratani et al. | 345/87 |
| 7,298,358 B2 * | 11/2007 | Honbo | 345/102 |
| 7,385,583 B2 * | 6/2008 | Kim et al. | 345/102 |
| 7,719,511 B2 * | 5/2010 | Huang | 345/102 |
| 2002/0067332 A1 | 6/2002 | Hirakata et al. | |
| 2004/0252097 A1 | 12/2004 | Kaneki et al. | |
| 2005/0007389 A1 | 1/2005 | Kumamoto et al. | |
| 2006/0038771 A1 | 2/2006 | Hirakata et al. | |

FOREIGN PATENT DOCUMENTS

| | | |
|---|---|---|
| CA | 2458214 | 10/2003 |
| CN | 1356681 | 7/2002 |
| CN | 1565014 | 1/2005 |
| EP | 1 213 699 | 6/2002 |

(Continued)

*Primary Examiner* — Duc Dinh
(74) *Attorney, Agent, or Firm* — Harness, Dickey & Pierce, P.L.C.

(57) ABSTRACT

Provided are data lines, scanning lines crossing the data lines, and a switching element in vicinity of each intersection of the data lines and the scanning lines, the data lines being connected via the switching elements with pixel electrodes arranged in matrix. Direct-type backlights arranged in parallel with the scanning lines are provided, and a backlight turning-ON drive circuit for turning the direct-type backlights in order at a predetermined frequency in sync with a scanning signal is provided. In at least one embodiment, the backlight turning-ON drive circuit includes a controller for controlling the direct-type backlights to turn ON in order in sync with the scanning signal in such a manner that the direct-type backlights are turned ON discretely over frames being continuous based on a vertical sync signal. In at least one embodiment, this provides a liquid crystal display device, which adopts scanning-type backlights and in which the pseudo contour and the flickering can be prevented with a driving clock of 60 Hz, which is generally adopted in liquid crystal display devices.

12 Claims, 7 Drawing Sheets

FOREIGN PATENT DOCUMENTS

| | | |
|---|---|---|
| EP | 1 489 590 | 12/2004 |
| JP | 2000-321551 | 11/2000 |
| JP | 2003-050569 | 2/2003 |
| JP | 2004-004659 | 1/2004 |
| JP | 2005-222011 | 8/2005 |
| WO | WO 03/083820 | 10/2003 |

* cited by examiner

FIG. 6 (a) CONVENTIONAL ART
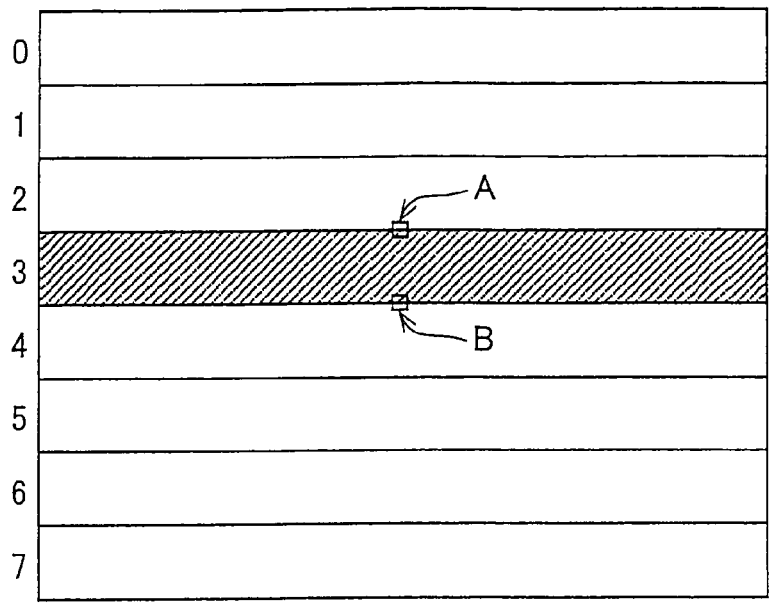
FIG. 6 (b) CONVENTIONAL ART
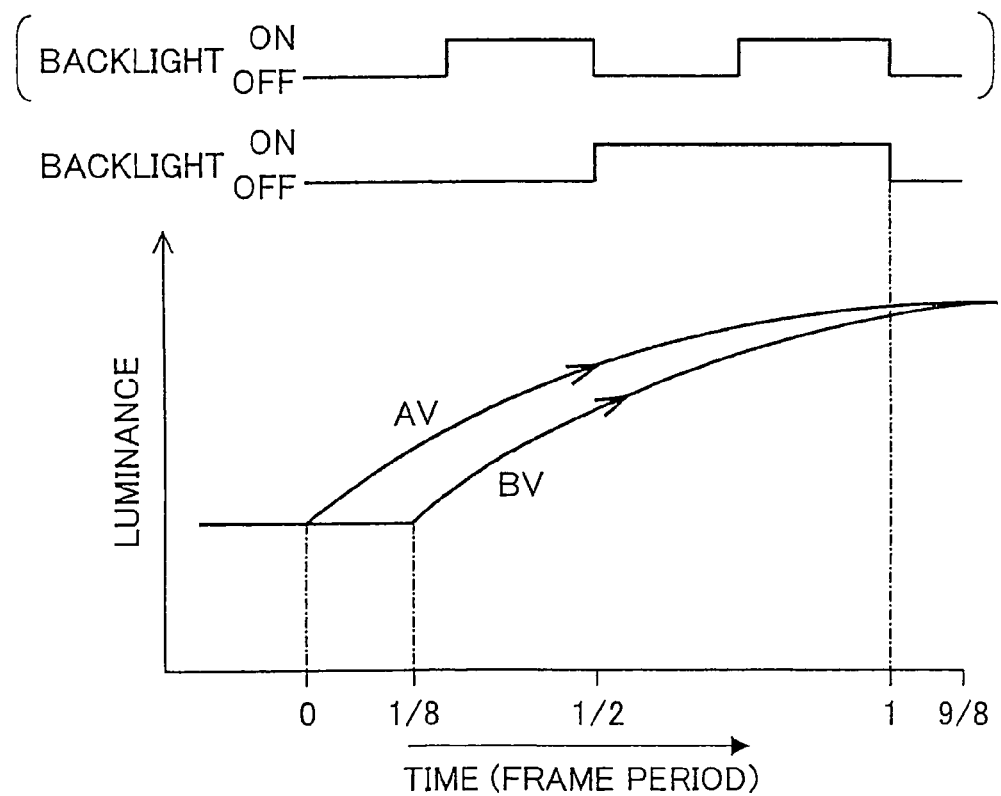

LIQUID CRYSTAL DISPLAY DEVICE

TECHNICAL FIELD

The present invention relates to a liquid crystal display device comprising a scanning type backlight.

BACKGROUND ART

A liquid crystal display device of an active matrix type is a display device that performs hold-type driving in which, with respect to a certain pixel, color and luminance in the pixel are varied by writing data to the pixel, but display in the pixel is stationary held until next data change. Therefore, not only a current frame but also a frame right before the current frame are recognized in the liquid crystal display device. This leads to poor moving image display quality due to edge blurring.

In order to solve this problem, a liquid crystal display device of an active matrix type disclosed in Patent Document 1, for example, is arranged such that a plurality of direct-type backlights are arranged in parallel with scanning lines and are controlled to blink in order in sync with a scanning signal in one field period in which all the scanning lines are scanned. With this method, a hold period of an image signal can be shortened apparently, and the liquid crystal display device can be driven by pseudo impulse-type driving. Thereby, moving image display performance is improved.

[Patent Document 1] Unexamined patent application Publication, Tokukai, No. 2000-321551 (published on Nov. 24, 2000)

DISCLOSURE OF INVENTION

However, the liquid crystal display apparatus of the impulse-type driving performed with the conventional scanning-type backlights has a problem in that double edging, that is, a pseudo contour occurs with insufficient response control of a liquid crystal panel, and in that flickers inevitably associated with impulse occurs.

Why these problems occur is described below.

For example, assume that backlights No. 0 to No. 7 are provided in one screen as illustrated in FIG. 6(*a*). For example, consider a pixel A at a border between the backlights No. 2 and No. 3, and a pixel B at a border between the backlights No. 3 and No. 4.

Assume that a source voltage is applied on the pixel A at Time 0. Then, a charging voltage of the pixel A is held by a TFT. Liquid crystal in the pixel A responds gradually in a frame period. Therefore, luminance in the pixel A shows such a change as illustrated in FIG. 6(*b*) that the luminance rises from Time 0 showing the AV curve and reaches its maximum in substantially one frame period. On the other hand, because the pixel B is applied with the voltage in a time lag of ⅛ frame period, luminance of the pixel B reaches its maximum in substantially one frame period (9/8 frame period by an absolute value) according to the voltage.

Assume that, for example, the backlights are turned on from ½ frame period that is a second half of the one frame period. If a luminance reaching rate of the pixel A is, for example, 80%, then a luminance reaching rate of the pixel B, which is driven with such a time lag is merely 50%, for example.

Therefore, for example in an image in which the pixels A and B should display the same luminance, the luminance displayed at the pixel A is different from one displayed at the pixel B. For a viewer looking at the screen, luminance change at the pixel B is insufficient compared with that at the pixel A, whereby a double contour appears, which is different from a counter supposed to be. Therefore, double edging, that is, a pseudo contour occurs. Needless to say, if the response at the pixel A is insufficient, such a double edge occurs at the pixel A. The luminance at this edge is different from the one at the pixel B, thereby resulting in poorer display. This phenomenon would occur at border areas of each backlight. Thus, patterns of the response are extracted in the same phase always. That is, significant double edging is observed at the same position always.

On the other hand, the backlights driven in sync with a refresh period cause flickering. In the above phenomenon, the double edge is displayed more noticeably due to a slow response speed of the liquid crystal and picking-up of the slow response behavior of the liquid crystal at the same time always. Further, a driving clock of the liquid crystal display device at 60 Hz causes the flickers to be more noticeable.

Therefore, the flickering can be prevented apparently by turning on the black lights at a 2-time faster driving clock speed, that is, 120 Hz. This, however, cannot solve the problem of double edging, because even with 120 Hz, the AV curve and BV curve show different accumulated luminance in the ON period in which the backlight is turned ON. Furthermore, there is a limited in high speed lighting of CCFT (Cold Cathode fluorescent Tube), which is generally adopted as the backlights. Moreover, in terms of the moving image response performance improvement that is originally aimed, it is more effective not to fragmentize OFF periods, and a lower frequency is preferable as long as the above problem can be solved.

The present invention is accomplished in view of the conventional problems. An object of the present invention is to provide a liquid crystal display device, which adopts scanning-type backlights and in which the pseudo contour and the flickering can be prevented with a driving clock of 60 Hz, which is generally adopted in liquid crystal display devices.

In order to attain the object, a liquid crystal display device of the present invention is a liquid crystal display device including data lines, scanning lines crossing the data lines, and a switching element in vicinity of each intersection of the data lines and the scanning lines, the data lines being connected via the switching elements with pixel electrodes arranged in matrix, the liquid crystal display device comprising: direct-type backlights arranged in parallel with the scanning lines; and a backlight turning-ON drive circuit for turning the direct-type backlights in order at a predetermined frequency in sync with a scanning signal, the backlight turning-ON drive circuit including a controller for controlling the direct-type backlights to turn ON in order in sync with the scanning signal in such a manner that the direct-type backlights are turned ON discretely over frames being continuous based on a vertical sync signal.

In this invention, the direct-type backlights are arranged in parallel with the scanning lines and turned ON in sync with the scanning signal at the predetermined frequency, that is, in a certain period of time per frame, by the backlight turning=ON drive circuit.

Incidentally, if the direct-type fluorescent lamps 21 are turned ON in sync with the scanning signal in the same manner in consequent frames, the direct-type fluorescent lamps 21 are turned in the same way in each frame. This leads to flicking and pseudo contour. To solve this problem, the present embodiment is arranged such that the backlight turning-ON drive circuit includes the controller. The controller turns ON the direct-type backlights in order in sync with the scanning signals in such a manner that the direct-type backlights are turned ON discretely over frames being continuous based on the vertical sync signal. That is, the controller controls the direct-type backlights to turn ON in such a manner that, among the frames being continuous based on the vertical sync signal, the direct-type backlights turn ON in order in sync with the scanning signal at a first timing in some frames, while the direct-type backlights turn ON in order in sync with the scanning signal at a second timing in other frames.

As a result, the direct-type fluorescent lamps 21 are not turned ON in order in sync with the scanning line in the same manner over the continuous frames. Consequently, the position where the pseudo contour can be easily recognized is changed in each frame. This prevents the pseudo contour.

Thus, it is possible to provide a liquid crystal display device in which the pseudo contour can be prevented while the scanning-type backlights 20 are driven at driving clock 60 Hz, which is generally adopted in liquid crystal display devices.

The liquid crystal display device according to the present invention is preferably arranged such that in every other frame among the frames being continuous based on the vertical sync signal, the controller turns ON the direct-type backlights in order in sync with the scanning signal.

According to the present invention, it is arranged such that, for example, the turning-ON of the direct-type fluorescent lamps 21 is performed in-phase in odd-number frames, but the turning-ON thereof is performed in the other phase in even-number frames than in the odd-number frames. As a result, different frames have different areas in which double-edging can be easily recognized by human eyes. This makes it possible to prevent the pseudo contour.

Moreover, the liquid crystal display device of the present invention is preferably arranged such that the predetermined frequency for turning ON the direct-type backlights is 2/(2n+1) of a refresh period of the scanning lines (where n is an integer greater than or equal to 1), and scanning is repeated in two frame periods that are designated as frames in which the synchronization is carried out. That is, it is preferably that the scanning be performed at a frequency of 2/(2n+1) thereof within the sync period that occurs in every other frame, and the scanning is repeated until a next frame designated as a frame in which the scanning is carried out. Especially, it is preferable that the predetermined frequency is ⅔ thereof. With this arrangement, an area in which the double-edging is most significant and an area in which the double-edging is least significant are exchanged with each other every frame. This makes it difficult to recognize the double-edging and prevent the double-edging from interfering the image (i.e., prevent beating).

The liquid crystal display device of the present invention is preferably arranged such that the backlight turning-ON drive circuit drives the direct-type backlights in such a manner that the direct-type backlights repeat a turning-ON period and a turning-OFF period, which periods are identical in length.

This makes it possible to prevent the flickering and pseudo contour without scarifying display luminance of a certain level.

Moreover, the liquid crystal display device of the present invention is preferably arranged such that the scanning lines are scanned at 60 Hz, and the backlight turning-ON drive circuit drives the direct-type backlights at 90 Hz. According to the present invention, it is arranged such that the clock for the direct-type backlights is 90 Hz while the clock for scanning the scanning lines is 60 Hz. This prevents the flickering and makes it more difficult to recognize the double-edging by inversing the phases of the turning-ON period and the turning-OFF period every frame.

Moreover, the liquid crystal display device of the present invention is preferably arranged such that the direct-type backlights are cold cathode fluorescent tubes. This arrangement makes it possible to prevent the pseudo contour and flickering in a liquid crystal display device including CCFTs that are conventionally used as the direct-type backlights.

For a fuller understanding of the nature and advantages of the invention, reference should be made to the ensuing detailed description taken in conjunction with the accompanying drawings.

BRIEF DESCRIPTION OF DRAWINGS

FIG. 6(a) is a view illustrating a conventional liquid crystal display device and is a plan view illustrates a display panel in which direct-type fluorescent lamps are provided in parallel with scanning lines.

FIG. 6(b) is a timing chart illustrating how pixels A and B are charged.

REFERENCE NUMERALS

3: Data Line
4: Scanning Line
5: Pixel Electrode
6: TFT (Switching Element)
20: Backlight
21: Direct-Type Fluorescent Lamp (Direct-Type Backlight)
30: Driving Voltage Timing Control Circuit (Backlight Lighting Drive circuit)
31: Controller

BEST MODE FOR CARRYING OUT THE INVENTION

One embodiment of the present invention is described below, referring to FIGS. 1 to 5.

Figure 2:
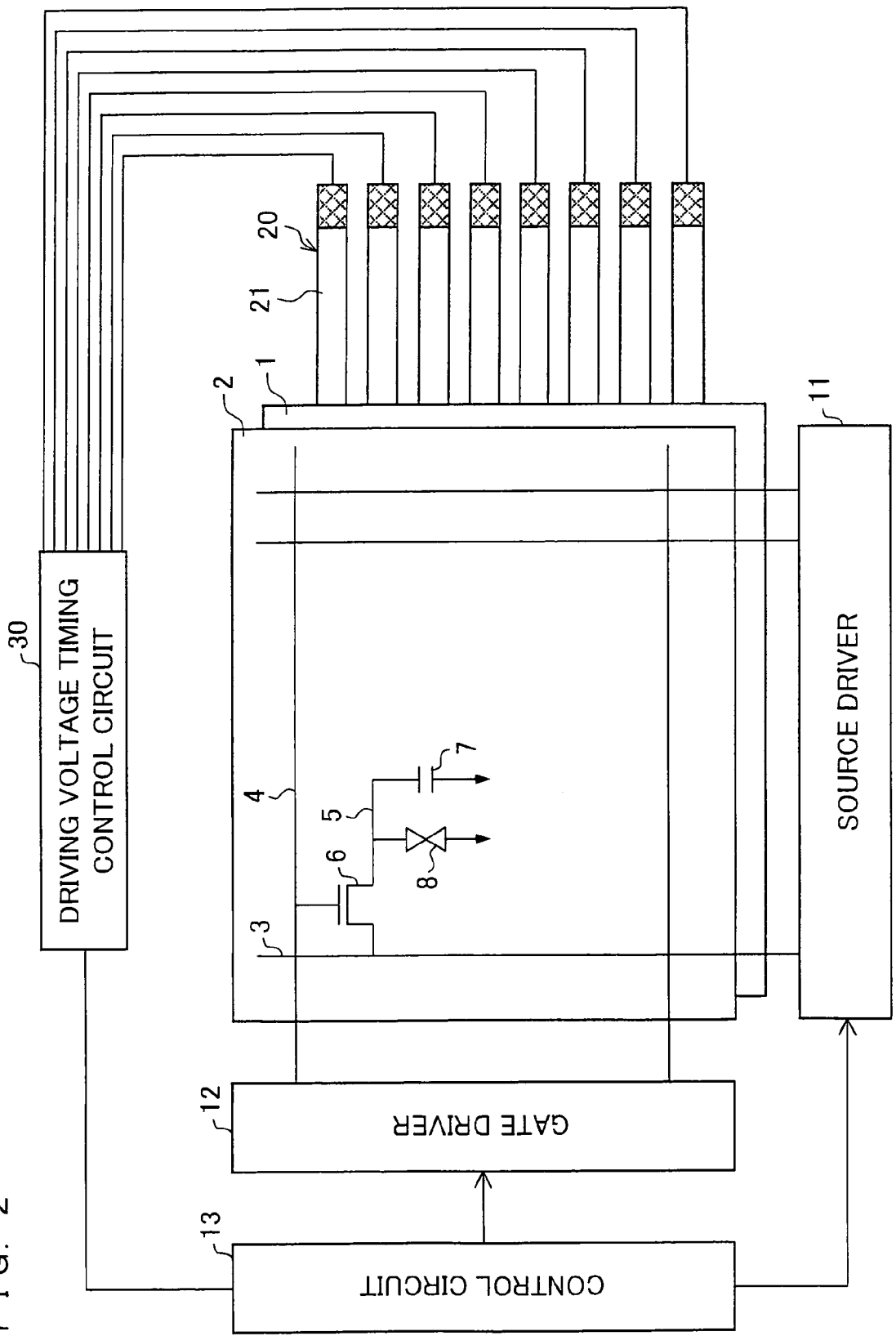
FIG. 2 is a block diagram illustrating a whole configuration of the liquid crystal display device.

As illustrated in FIG. 2, a liquid crystal display device of the present embodiment includes an array substrate 1 and a counter substrate 2, which face each other with a certain gap and sandwich liquid crystal therebetween. The array substrate 1 and a counter substrate 2 are glass substrates. On the counter substrate 2, a common electrode (not illustrated) is formed substantially all over its surface.

On the array substrate 1, a plurality of data lines 3 and a plurality of scanning lines 4 are formed crosswise. the data lines 3 and scanning lines 4 segments the array substrate 1 in matrix, thereby defining a pixel region in each segment. Each pixel region is provided with a pixel electrode 5. In the vicinity of each intersection of the data lines 3 and scanning lines 4, a TFT (Thin Film Transistor) 6 is disposed as a switching element. A source electrode of the TFT 6 is connected with one data line 3, meanwhile a gate electrode thereof is connected with one scanning line 4. A drain electrode of the TFT 6 is connected with one pixel electrode 5 that faces a retention capacitor 7 and liquid crystal 8.

Each data line 3 is connected to a source driver 11 and each scanning line 4 is connected to a gate driver 12. The source driver 11 and the gate driver 12 are connected to a control circuit 13, which control them. In the present embodiment, 8 direct-type fluorescent lamps 21 are provided on a back side of the array substrate 1, and act as backlights 20. The fluorescent lamps 21 are referenced as No. 1 lamp line to No. 7 lamp line. That is, the liquid crystal display apparatus of the present embodiment is a panel compatible with the VGA standard (having 480 scanning lines) and is arranged such that one direct-type fluorescent lamp 21 works for 60 scanning lines. Note that the present invention is not limited to the liquid crystal display device of the present embodiment in which 8 backlights 20 are provided, for an example. More or less backlights 20 may be provided in the present invention. Moreover, the present invention is not limited to the present embodiment, in which the liquid crystal display device is a panel compatible with the VGA standard (having 480 scanning lines), for an example. The liquid crystal display device may be a panel compatible with another standard, in the present invention. That is, the present invention relates to the relationship between the scanning of the backlights 20 and the scanning of the scanning lights 4, and is not limited in terms of the number of the backlights 20, which may be selected depending on display capacity, display area, luminance specification, etc.

In the liquid crystal display device, control of an image signal is carried out as follows. To begin with, an external data signal, which includes an image data signal, vertical/horizontal sync signal, and a power supply voltage, is inputted in the control circuit 13. Based on the vertical/horizontal sync signal, the control circuit 13 generates a clock signal for supplying to the source driver 11, and a clock signal for switching over the scanning lines 4. The source driver 11 starts shift register operation at the same time a start pulse raises. The source driver 11 operates according to the clock, which is of 60 Hz in the present embodiment for the sake of liquid crystal display driving.

The data to be inputted in sync of the clock is stored in a sampling memory selected by a shift register. After whole display data for one horizontal line has been sent, the control circuit 13 outputs a latch pulse. When the source driver 11 receives the latch pulse, a hold memory latches, in batch, the data stored in the sampling memory. The latched data is D/A converted and then outputted to the data lines 3. By applying an ON voltage on one of the scanning lines 4, all the TFTs 6 in one horizontal line are turned ON. In this way, data of one line is displayed. By repeating this operation in the same manner, all the scanning lines 4 are scanned vertically thereby driving all the lines. Along the scanning of the scanning lines 4 from top to bottom of the screen, the direct type fluorescent lamps 21 are turned ON in order.

How to turn on the backlights 20 in the liquid crystal display device according to the present embodiment arranged as above is described below.

Figure 7:
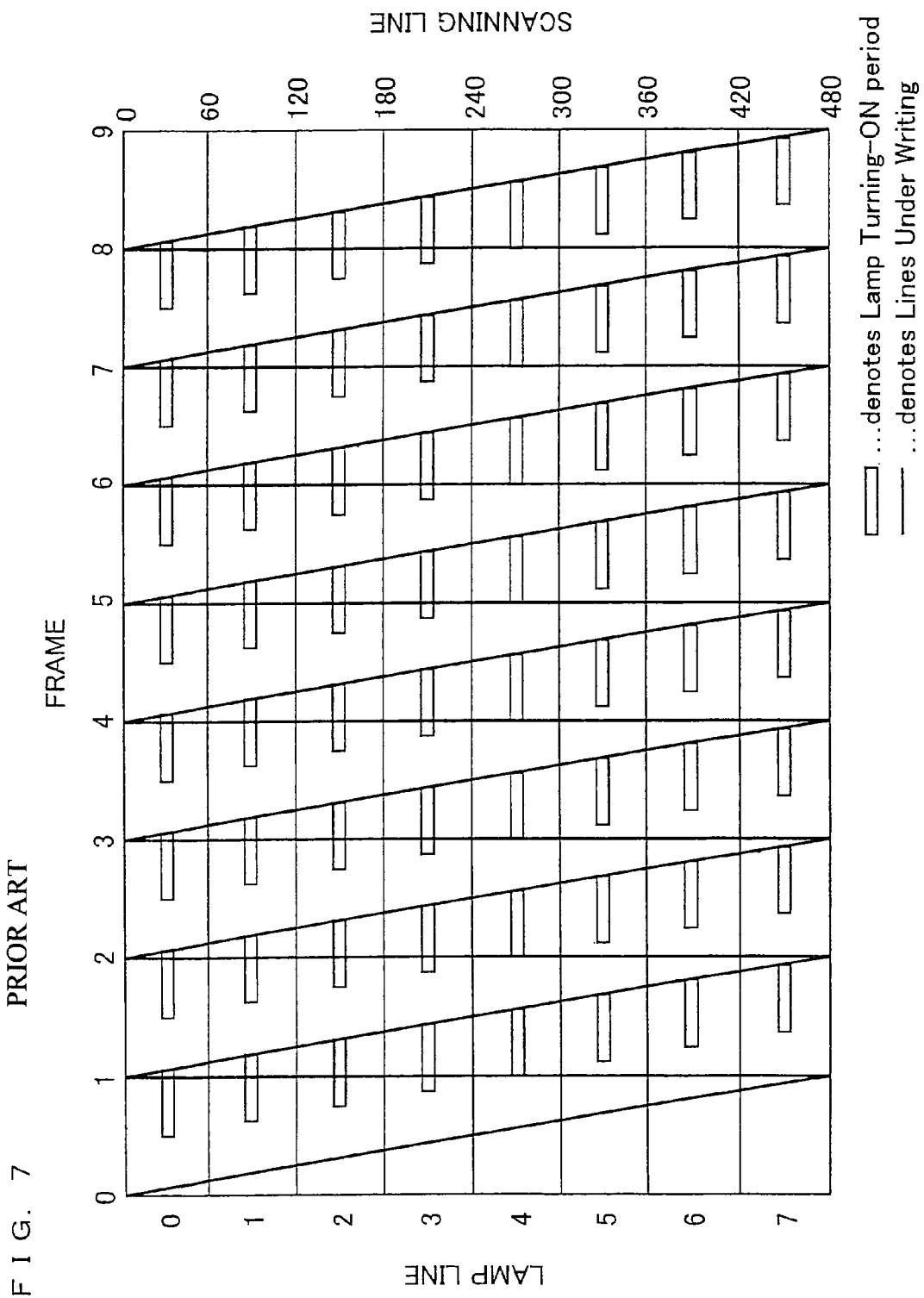
FIG. 7 is a timing chart illustrating timing scanning of scanning lines and lighting of backlights in the conventional liquid crystal display device.

Conventionally, the direct type fluorescent lamps are turned ON at the same timing in one frame as illustrated in FIG. 7. For example, the direct-type fluorescent lamps arranged along 0th lamp line located on the highest section in the screen (upper side of the paper of FIG. 7) to the 7th lamp line, are turned ON in order in the second half of one frame period along scanning in the vertical direction. Therefore, the conventional turning-ON of the direct-type fluorescent lamps is performed such that the direct-type fluorescent lamps are turned ON in sync with the vertical sync signal in each vertical period.

Figure 1:
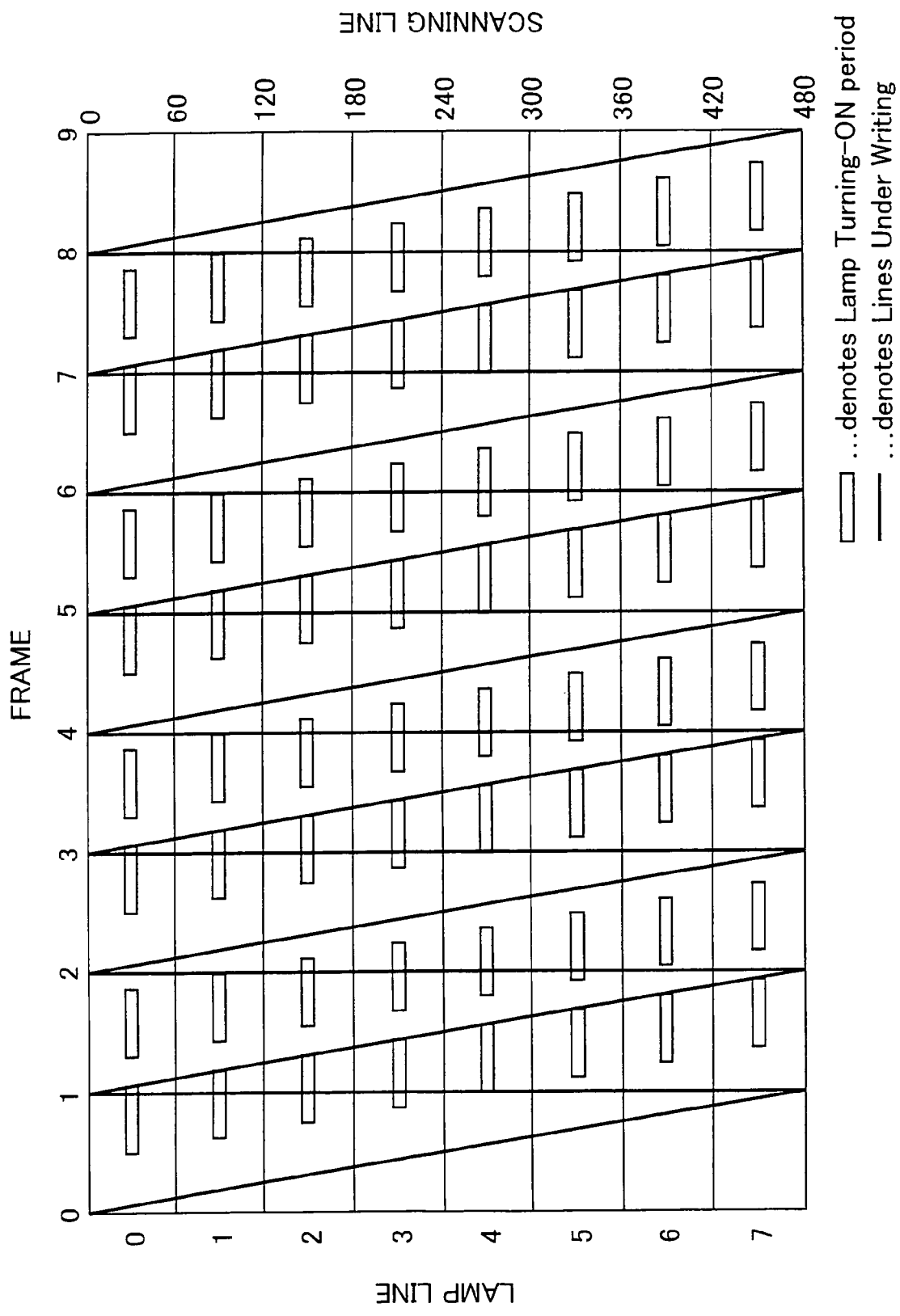
FIG. 1 is a view illustrating one embodiment of a liquid crystal display device of the present invention and is a timing chart for illustrating timing between scanning of scanning lines and lighting of backlights.

On the other hand, as illustrated in FIG. 1, the present embodiment is arranged such that the direct-type fluorescent lamps 21 are in sync with the vertical sync signal once in two vertical periods. More specifically, the turning-ON of the direct-type fluorescent lamps in the first frame is performed such that the direct-type fluorescent lamps arranged along 0th lamp line located on the highest section in the screen (upper side of the paper of FIG. 1) to the 7th lamp line, are turned ON in order in the second half of one frame period along the scanning in the vertical direction, as in the conventional art.

However, the turning-ON of the direct-type fluorescent lamps in the second frame is performed such that the direct-type fluorescent lamps along 0th lamp line located on the highest section in the screen (upper side of the paper of FIG. 1) to the 7th lamp line, are turned ON in order in a substantially middle period of one frame period along the scanning in the vertical direction. In the second frame, the direct-type fluorescent lamps are turned ON in a ½ period of one frame as in the first frame. The turning-ON of the direct-type fluorescent lamps in the first frame is performed such that the direct-type fluorescent lamps arranged along 0th lamp line located on the highest section in the screen (upper side of the paper of FIG. 1) to the 7th lamp line, are turned ON in order in the second half of one, as in the first frame.

Thus, the present embodiment is arranged such that the synchronization occurs once in two vertical periods.

That is, conventionally, the direct-type fluorescent lamps are turned ON in the later ½ frame period in all the frames, the backlight scanning period matches with the frame period, and the turning-ON of the direct-type fluorescent lamps is identically performed in all the frames. These lead to flickering and pseudo contour.

On the other hand, the present embodiment is arranged such that, for example, the turning-ON of the direct-type fluorescent lamps 21 is performed in-phase in odd-number frames, but the turning-ON thereof is performed in the other phase in even-number frames than in the odd-number frames. As a result, different frames have different areas in which double-edging can be easily recognized by human eyes. This makes it possible to prevent the pseudo contour.

Figure 3:
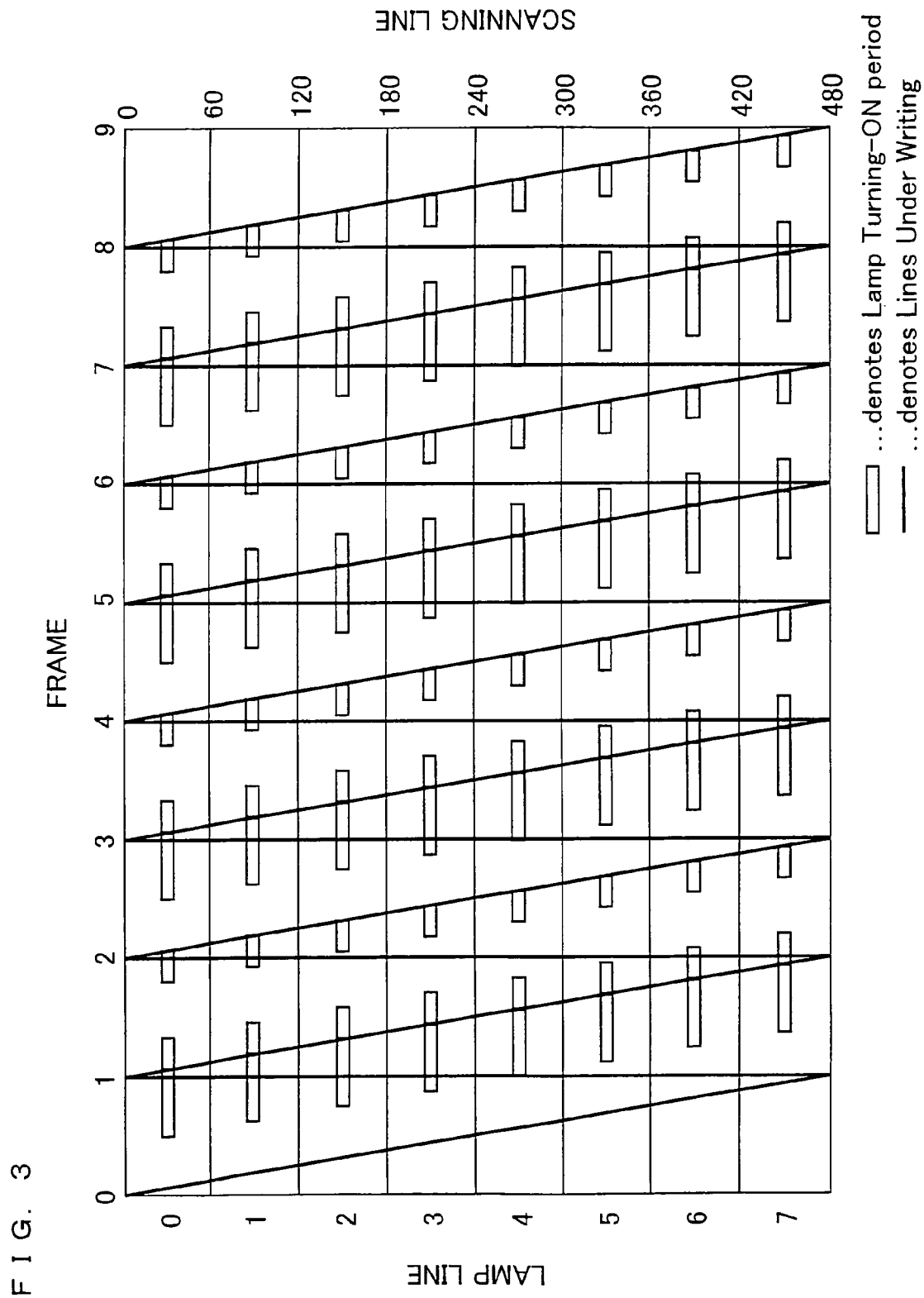
FIG. 3 is a timing chart illustrating another timing of the scanning of the scanning line and lighting of the backlights of the liquid crystal display device.

The above is merely an example of how to turn ON the backlights 20, and the present invention is not limited to this. For example, as illustrated in FIG. 3, the turning-ON of the backlights 20 in the even-number frames is performed such that the backlights 20 are turned ON partly in the first half and partly in the second half in one frame period. Again in this way, the turning-ON of the direct-type fluorescent lamps 21 is performed in the other phase in even-number frames than in the odd-number frames. As a result, it never happens that human eyes see a position displayed darkly always while another position displayed brightly always. This prevents the pseudo contour. In the present embodiment, the backlights 20 are driven by a driving voltage timing control circuit 30 acting as a backlight turning-ON drive circuit. The driving voltage timing control circuit 30 is described in details referring to the flowcharts of FIG. 3 and FIG. 4.

Figure 4:
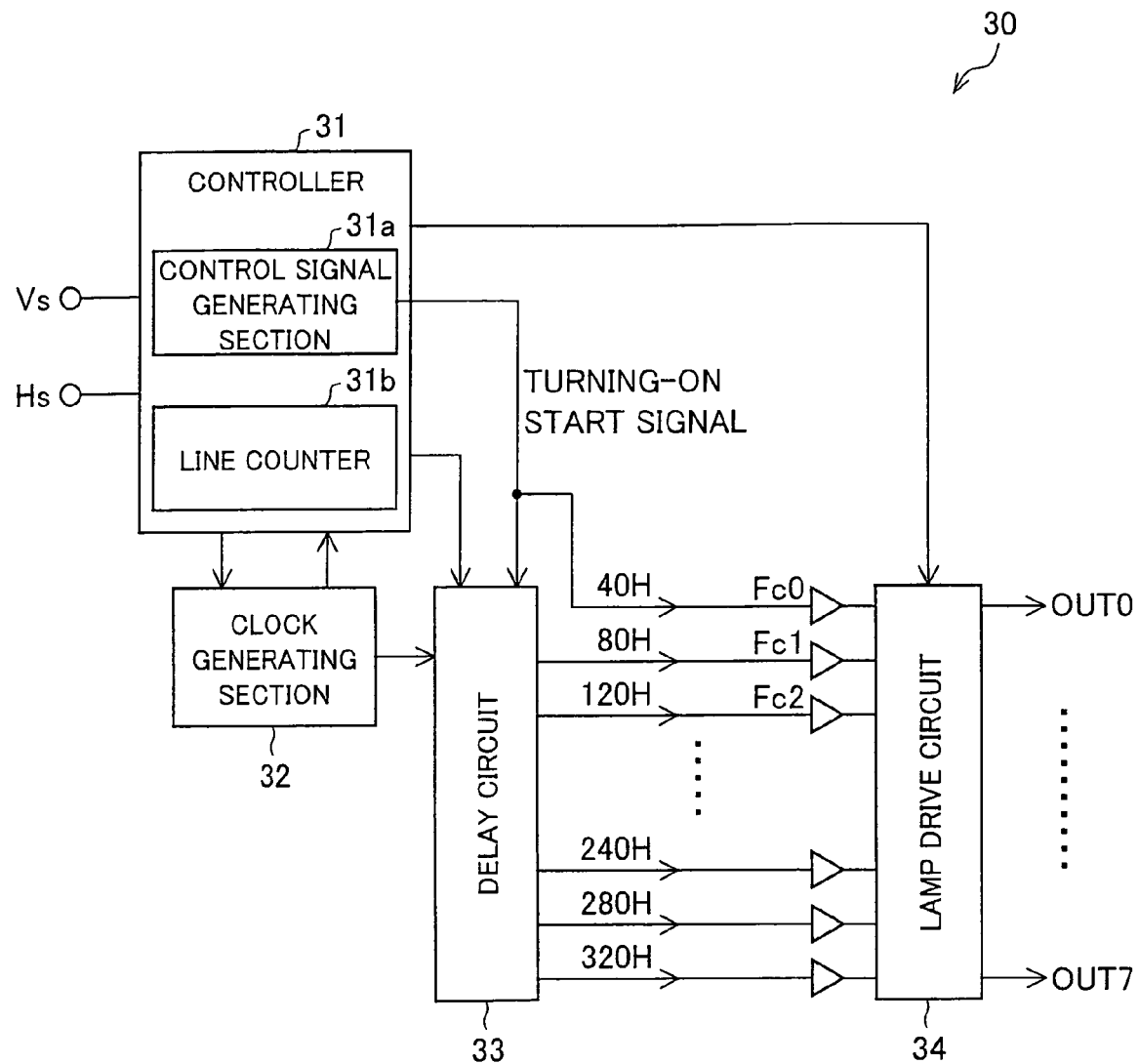
FIG. 4 is a block diagram illustrating a concrete configuration of a driving voltage timing control circuit of the liquid crystal display device.

The driving voltage timing control circuit 30, as illustrated in FIG. 4, includes a controller 31, a clock generating section 32, and a delay circuit 33, and a lamp drive circuit 34. Moreover, the controller 31 includes a control signal generating section 31a and a line counter 31b.

The clock generating section 32 generates 90 Hz, for example. This 90 Hz is 1.5 times greater than 60 Hz used in the control circuit for displaying the liquid display device. That is, in the present embodiment the backlights 20 generate turning-ON frequency of 90 Hz in order that the backlights 20 are turned ON in different turning-ON times in each frame.

Figure 5:
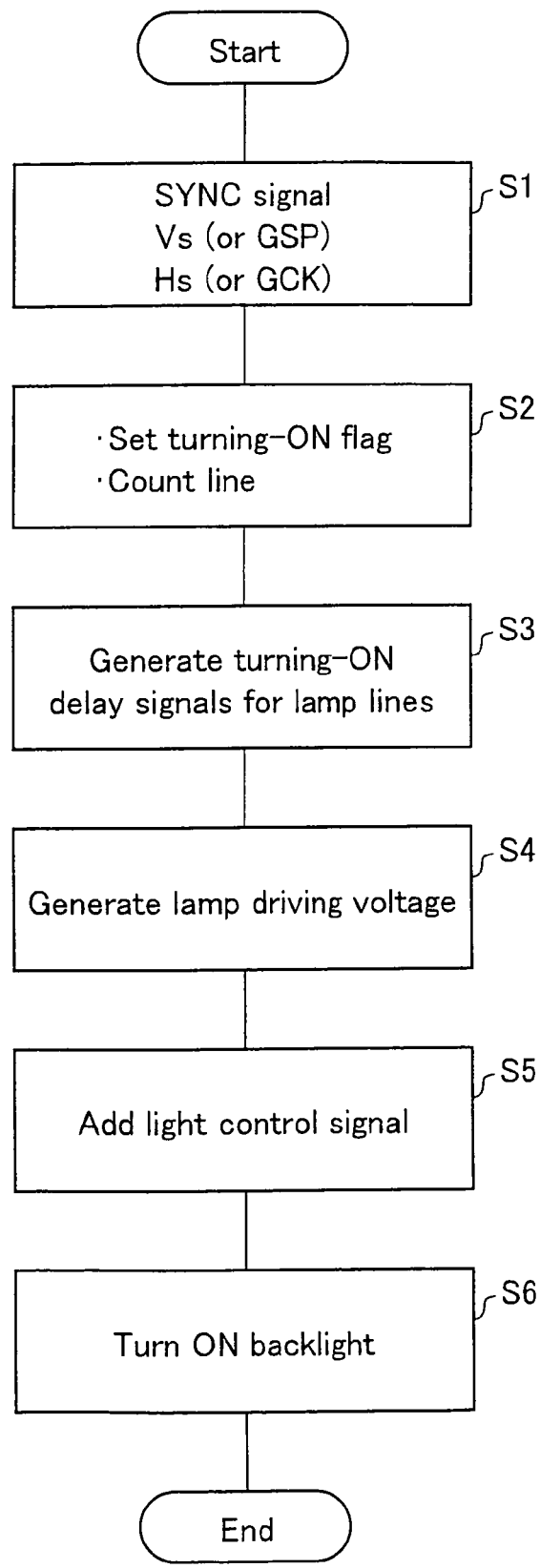
FIG. 5 is a flow chart illustrating driving operation of scanning of the scanning lines and the lighting of the backlights by the driving voltage timing control circuit.

The control signal generating section 31a of the controller 31 receives a vertical signal sync signal Vs (S1), as illustrated in FIG. 5. Then, the control signal generating section 31a generates a turning-ON start signal for the 0th lamp line, according to the 90 Hz clock from the clock generating section 32. That is, a turning-ON flag is set. Moreover, the line counter 31b adds one to a count number every time a horizontal sync signal Hs is inputted (S2). The vertical signal sync signal Vs may be a gate start pulse (GPS), while the horizontal sync signal Hs may be a gate clock signal (GCK).

Then, the turning-ON start signal generated by the control signal generating section 31a is inputted to the delay circuit 33. The delay circuit 33 generates a turning-ON delay signal for the lamp lines of the direct-type fluorescent lamps 21 (S3). That is, in order to turn ON the direct-type fluorescent lamps 21 along the scanning of the scanning lines 4 in the vertical direction, time lags for the respective lamp line from the turning-ON of the 0th lamp line are set. In the present embodiment, the time lags are 40 H period, for example.

Next, the lamp drive circuit 34 generates a voltage for turning ON the direct-type fluorescent lamps 21 (S4). The direct-type fluorescent lamps 21 are turned ON, for example, with a voltage in a range of 800 Vrms to 1500 Vrms. Here, the lamp drive circuit 34 adds a light control signal (S5). The light control signal is added to adjust the luminance. The light control signal may be added as an analogue signal or a digital signal. It is not necessary to use an expensive digital circuit in order to prepare a light control portion containing a high frequency wave.

Finally, the direct-type fluorescent lamps 21 of the backlights 20 are turned ON in order (S6).

This operation is not limited to this flow. Moreover, the delay circuit 33 may be a digital circuit or an analogue circuit. In the present invention, however, the delay operation is preferably digital for phase control, because such a digital delay operation is accurate and capable of flexibly cooperating with a change in an impulse level (such as a change in turning-ON period ratio).

As described above, the liquid crystal display device of the present embodiment is arranged such that the direct-type fluorescent lamps 21 are arranged in parallel with the scanning lines 4, and are turned ON in order at predetermined frequency (that is, in a certain period of time in each frame) in sync with the scanning signal by the driving voltage timing control circuit 30.

Incidentally, if the direct-type fluorescent lamps 21 are turned ON in sync with the scanning signal in the same manner in consequent frames, the direct-type fluorescent lamps 21 are turned in the same way in each frame. This leads to flicking and pseudo contour. To solve this problem, the present embodiment is arranged such that the driving voltage timing control circuit 30 includes the controller 31. The controller 31 turns ON the direct-type fluorescent lamps 21 in order in sync with the scanning signals in such a manner that the direct-type fluorescent lamps 21 are turned ON discretely over frames being continuous based on the vertical sync signal.

That is, the controller 31 controls the direct-type fluorescent lamps 21 to turn ON in such a manner that, among the frames being continuous based on the vertical sync signal, the direct-type fluorescent lamps 21 turn ON in order in sync with the scanning signal at a first timing in some frames, while the direct-type fluorescent lamps 21 turn ON in order in sync with the scanning signal at a second timing in other frames.

As a result, the direct-type fluorescent lamps 21 are not turned ON in order in sync with the scanning line in the same manner over the continuous frames. Consequently, the position where the pseudo contour can be easily recognized is changed in each frame. This prevents the pseudo contour.

Thus, it is possible to provide a liquid crystal display device in which the pseudo contour can be prevented while the scanning-type backlights 20 are driven at driving clock 60 Hz, which is generally adopted in liquid crystal display devices.

Moreover, the liquid crystal display device of the present embodiment is preferably arranged such that in every other frame among the frames being continuous based on the vertical sync signal, the controller turns ON the direct-type backlights in order in sync with the scanning signal.

More specifically, for example, the turning-ON of the direct-type fluorescent lamps 21 is performed in-phase in odd-number frames, but the turning-ON thereof is performed in the other phase in even-number frames than in the odd-number frames. As a result, different frames have different areas in which double-edging can be easily recognized by human eyes. This makes it possible to prevent the pseudo contour.

Moreover, the liquid crystal display device of the present embodiment is preferably arranged such that the predetermined frequency for turning ON the direct-type backlights is 2/(2n+1) of a refresh period of the scanning lines (where n is an integer greater than or equal to 1), and scanning is repeated in two frame periods that are designated as frames in which the synchronization is carried out. That is, it is preferably that the scanning be performed at a frequency of 2/(2n+1) thereof within the sync period that occurs in every other frame, and the scanning is repeated until a next frame designated as a frame in which the scanning is carried out. Especially, it is preferable that the predetermined frequency is 2/3 thereof. With this arrangement, an area in which the double-edging is most significant and an area in which the double-edging is least significant are exchanged with each other every frame. This makes it difficult to recognize the double-edging and prevent the double-edging from interfering the image (i.e., prevent beating).

What is meant by the refresh period is generally a period within which an image displayed on a display is rewritten over the whole screen (from the top to the bottom). It is well known that the refresh period relates to frame speeds of movies and scanning period of television. Every time the image is refreshed, the luminance of the display is fluctuated "inevitably" or "purposely". When the fluctuation reaches or surpasses a certain level, the fluctuation is recognized as flickers. In general, the refresh period is 1/24 seconds (24 Hz) in movies and the like, and 1/60 second (60 Hz) in television broadcast. The flickers flickering at 24 Hz are tolerable in movies displayed at theaters where the luminance is low. On the other hand, flickers flickering at 60 Hz are recognizable in the television broadcast where the luminance changes greatly.

Meanwhile, the liquid crystal display devices have been conventionally recognized such that a refresh period of 60 Hz causes flickers flickering at 30 Hz, which are small because the change in the luminance is small. However, in such a system in which the backlights are turned ON and OFF as in the present invention, the change in the luminance is large. Thus, even the flickers flickering at 60 Hz can be recognized in such a system. Therefore, the present invention is necessary in such a system.

The liquid crystal display device of the present embodiment is preferably arranged such that the driving voltage timing control circuit 30 drives the direct-type backlights in such a manner that the direct-type backlights repeat a turning-ON period and a turning-OFF period, which periods are identical in length.

This makes it possible to prevent the flickering and pseudo contour without scarifying display luminance of a certain level. Moreover, the liquid crystal display device of the present embodiment is preferably arranged such that the scanning lines are scanned at 60 Hz, and the driving voltage timing control circuit 30 drives the direct-type backlights at 90 Hz.

That is, even if the recognition of the pseudo contour is inhibited by arranging such that the turning-ON periods are out-of-phase in frames, the flickering problem could be noted in display where the frame period is 60 Hz or less, as long as the frame period and the backlight scanning periods match each other basically.

Especially, in case where the scanning is performed, at a frequency of 990 Hz or 150 Hz (2m+1) times greater than 60 Hz, the phases of the turning-ON period and the turning-OFF period are completely inversed every frame while the flickering is prevented. That is, the areas in which pseudo contour occurs are exchanged with each other completely. Thus, this arrangement is further effective in terms of inhibiting the recognition of the pseudo contour. Needless to say, as long as the flickering and pseudo contour can be prevented, a lower frequency is more preferable in terms of easy controlling of the lamps, power consumption, moving image performance, that is, having sufficient turning-OFF period. Because of this, 90 Hz for 60 Hz is more preferable.

Therefore, it may be arranged such that the clock for the direct-type fluorescent lamps 21 is 90 Hz while the clock for scanning the scanning lines 4 is 60 Hz. This makes it possible to attain a greater variation in phase changes without scarifying luminance.

Moreover, the liquid crystal display device of the present embodiment is preferably arranged such that the direct-type fluorescent lamps 21 are cold cathode fluorescent tubes (CCFT).

This arrangement makes it possible to prevent the pseudo contour and flickering in a liquid crystal display device including CCFTs that are conventionally used as the direct-type fluorescent lamps 21.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to a liquid crystal display device including a scanning-type backlight.

The invention claimed is:

1. A liquid crystal display device including data lines, scanning lines crossing the data lines, and a switching element in vicinity of each intersection of the data lines and the scanning lines, the data lines being connected via the switching elements with pixel electrodes arranged in matrix, the liquid crystal display device comprising:
   direct-type backlights arranged in parallel with the scanning lines; and
   a backlight turning-ON drive circuit configured to turn ON the direct-type backlights in order at a predetermined frequency in sync with a scanning signal,
   the backlight turning-ON drive circuit including a controller configured to control the direct-type backlights to turn ON in order in sync with the scanning signal in such a manner that the direct-type backlights are turned ON discretely over frames being continuous based on a vertical sync signal, and
   the backlight turning-ON drive being configured to provide different turn ON timings for the direct-type backlights for different frames, regardless of whether displayed images are changed or not.

2. The liquid crystal display device as set forth in claim 1, wherein
   the controller included in the backlight turning-ON drive circuit is configured to control the direct-type backlights to turn ON in such a manner that, among frames being continuous based on the vertical sync signal, the direct-type backlights turn ON in order at a first timing in some frames, while the direct-type backlights turn ON in order at a second timing in other frames.

3. The liquid crystal display device as set forth in claim 1, wherein the controller is configured such that in every other frame among the frames being continuous based on the vertical sync signal, the controller turns ON the direct-type backlights in order in sync with the scanning signal.

4. A liquid crystal display device as set forth in claim 3, wherein the predetermined frequency for turning ON the direct-type backlights is 2/(2n+1) of a refresh period of the scanning lines (where n is an integer greater than or equal to 1), and scanning is repeated in two frame periods that are designated as frames in which the synchronization is carried out.

5. The liquid crystal display device as set forth in claim 1, wherein the backlight turning-ON drive circuit is configured to drives the direct-type backlights in such a manner that the direct-type backlights repeat a turning-ON period and a turning-OFF period, which periods are identical in length.

6. The liquid crystal display device as set forth in claim 1, wherein:
   the liquid crystal display device is configured such that scanning lines are scanned at 60 Hz, and
   the backlight turning-ON drive circuit is configured to drives the direct-type backlights at 90 Hz.

7. The liquid crystal display device as set forth in claim 1, wherein the direct-type backlights are cold cathode fluorescent tubes.

8. The liquid crystal display device as set forth in claim 2, wherein the controller is configured such that in every other frame among the frames being continuous based on the vertical sync signal, the controller turns ON the direct-type backlights in order in sync with the scanning signal.

9. A liquid crystal display device as set forth in claim 8, wherein the predetermined frequency for turning ON the direct-type backlights is 2/(2n+1) of a refresh period of the scanning lines (where n is an integer greater than or equal to 1), and scanning is repeated in two frame periods that are designated as frames in which the synchronization is carried out.

10. The liquid crystal display device as set forth in claim 2, wherein the backlight turning-ON drive circuit is configured to drive the direct-type backlights in such a manner that the direct-type backlights repeat a turning-ON period and a turning-OFF period, which periods are identical in length.

11. The liquid crystal display device as set forth in claim 2, wherein:
    the liquid crystal display device is configured such that the scanning lines are scanned at 60 Hz, and
    the backlight turning-ON drive circuit is configured to drives the direct-type backlights at 90 Hz.

12. The liquid crystal display device as set forth in claim 2, wherein the direct-type backlights are cold cathode fluorescent tubes.

* * * * *